United States Patent [19]

Marom

[11] 4,275,399

[45] Jun. 23, 1981

[54] APPARATUS FOR DETERMINING THE DIRECTION OF ARRIVAL OF APPLIED ENERGY

[75] Inventor: Emanuel Marom, Los Angeles, Calif.

[73] Assignee: Hughes Aircraft Company, Culver City, Calif.

[21] Appl. No.: 63,010

[22] Filed: Aug. 2, 1979

[51] Int. Cl.³ .................................................. G01S 3/28
[52] U.S. Cl. .............................. 343/113 R; 343/5 SA; 343/112 C
[58] Field of Search ............. 343/113 R, 112 C, 5 SA

[56] References Cited

U.S. PATENT DOCUMENTS 3,991,418  11/1976  Bennett ............................ 343/113 R

OTHER PUBLICATIONS

B. Chen et al., *Diffraction–Limited Geodesic Lens for Integrated Optics Circuits;* Applied Physics Letters, vol. 36, No. 6, Sep. 15, 1978, pp. 511–513.

M. K. Barnoski et al., *Design Fabrication and Integration of Components for an Integrated Optic Spectrum Analyzer;* Ultrasonics Symposium Proceedings of IEEE, 1978, pp. 74–78.

D. L. Hecht, *Spectrum Analysis using Acousto-Optics Devices;* Optical Engineering, vol. 16, No. 5, Sep./Oct. 1977, pp. 461–466.

M. C. Hamilton et al., *An Integrated Optic RF Spectrum Analyzer;* Optical Engineering, vol. 16, No. 5, pp. 475–478, Sep./Oct. 1977.

*Primary Examiner*—T. H. Tubbesing
*Attorney, Agent, or Firm*—Kenneth W. Float; William H. MacAllister

[57] ABSTRACT

Apparatus is provided comprising two antennas generally oriented in non-parallel directions such that their effective apertures are different relative to received radiation, each antenna being individually connected to two integrated optica spectrum analyzers. Switching means is provided which alternately switches signals provided by the two antennas between the two integrated optic spectrum analyzers. A microcomputer is connected to the outputs of the two integrated optic spectrum analyzers for comparing the relative intensities of signals received therefrom and provide a signal indicative of the direction of arrival of radiation received by the two antennas.

2 Claims, 1 Drawing Figure

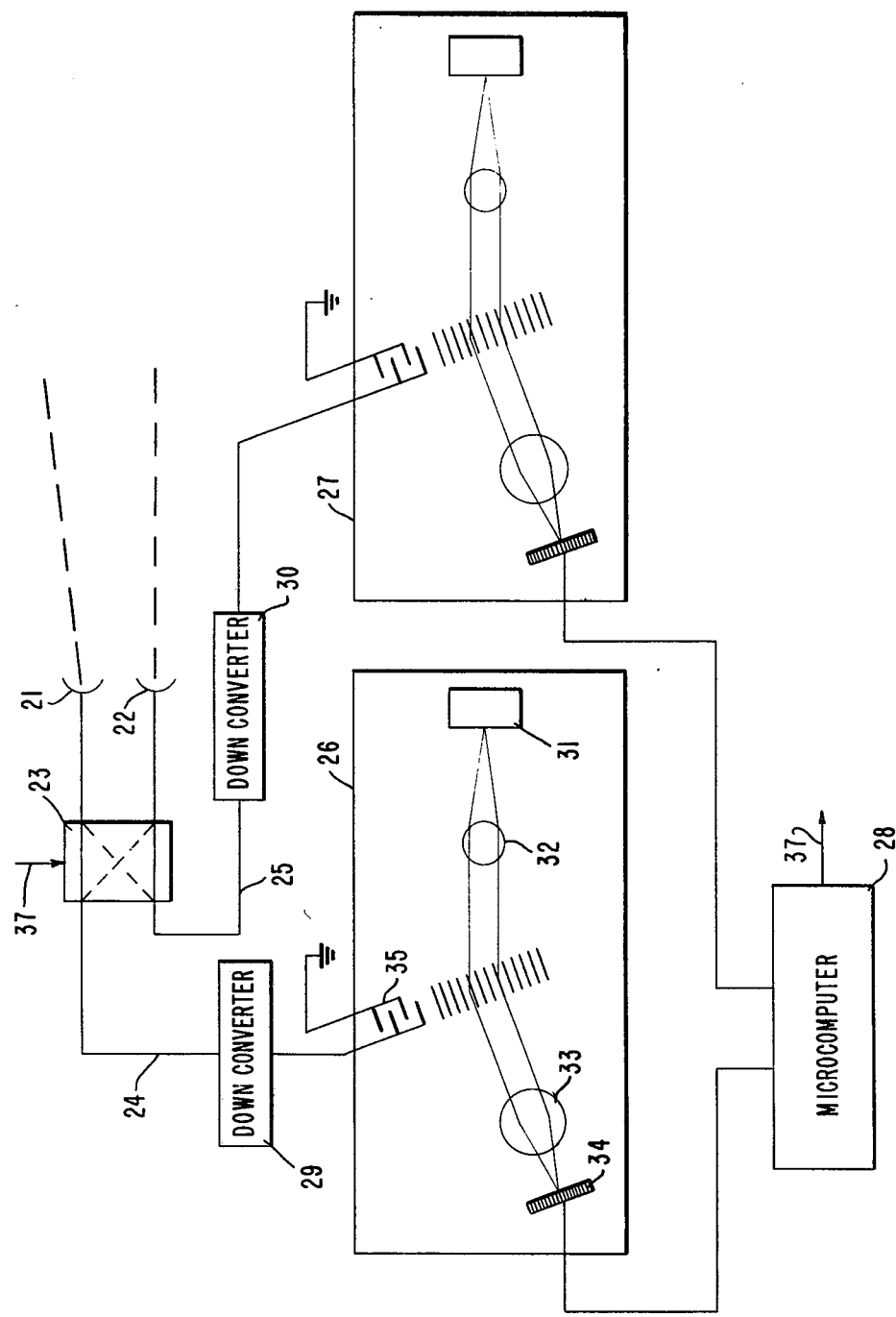

APPARATUS FOR DETERMINING THE DIRECTION OF ARRIVAL OF APPLIED ENERGY

The present invention relates generally to signal processors and, more particularly, to signal processors which incorporate integrated optics.

BACKGROUND

Generally, one desirable function of any radar system is to accurately determine the direction of arrival of radiation coming from a target. This may be accomplished by utilizing two receiving antennas and comparing either the relative amplitude or the relative phase of the energy received at the two antennas. Prior art systems have accomplished these comparisons by means of complex electronic circuits which are generally limited to operation at a single frequency. Accordingly it is desirable to have a less complicated means by which to obtain the direction of arrival determination.

SUMMARY OF THE INVENTION

Accordingly, it is an object of the present invention to provide an integrated optic signal processor which is capable of determining the direction of arrival of received energy.

In accordance with the present invention, apparatus is provided for determining the direction of arrival of energy applied thereto. The apparatus comprises first and second antennas pointed along first and second directions respectively for providing electrical signals indicative of energy received thereby. A first integrated optic spectrum analyzer is connected to receive the electrical signals provided by one of the antennas while a second spectrum analyzer is connected to receive electrical signals provided by the other antenna. The spectrum analyzers provide output signals which are proportional to the intensity and frequency of energy applied to the respective antennas connected thereto. A microcomputer processes the output signals from the two spectrum analyzers so as to provide a signal which is indicative of the direction of arrival of energy received by the two antennas.

The two antennas are pointed generally in the same direction but with an angle therebetween, and each antenna may be separately connected by way of separate downconverters to inputs of the two integrated optic spectrum analyzers. In order to compensate for possible differences in the two spectrum analyzers, switching means is provided which alternatively switches the electrical signals provided by the antennas between the two spectrum analyzers.

The microcomputer compares the intensities provided by the two integrated optic spectrum analyzers and normalizes these values over two successive data samples. Since the two antennas are pointed along non-parallel axes, the effective aperture relative to incoming radiation is different for the two antennas. Accordingly, the intensity of the radiation received by the antennas is unequal. Since the angle of orientation of the two antennas is known, a comparison of the intensity values received at the two antennas provides a measure of the direction of arrival of the incoming radiation.

Each spectrum analyzer comprises a laser source, collimating optics, a surface acoustic wave transducer, focusing optics and a detector array, all of which are disposed on an integrated circuit chip. The antenna signals are applied to the transducers which set up acoustic waves in the top surfaces of the chips. The acoustic waves act as a Bragg deflector with respect to laser light interacting therewith. The laser light is deflected in proportion to the intensity and frequency of the signals applied to the transducers.

The output of each detector array is analyzed by a microcomputer or the like, which provides an output signal which is indicative of the direction of arrival of the energy received by the two antennas and hence the direction of a target.

BRIEF DESCRIPTION OF THE DRAWING

The foregoing and other objects and features of the present invention may be more readily understood with reference to the following detailed description taken in conjunction with the accompanying drawing, in which like reference numerals designate like structrual elements, and in which:

The single FIGURE of the drawing is an illustration of a signal processor incorporating two integrated optic spectrum analyzers and made in accordance with the principles of the present invention.

DETAILED DESCRIPTION

Referring to the drawing, there is shown a signal processor made in accordance with the principles of the present invention. Two antennas 21,22 are disposed such that their lines of sight are along non-parallel directions. The outputs of the antennas 21,22 are separately connected by way of separate down-conversion means 29,30 to inputs of two integrated optic spectrum analyzers 26,27 by means of separate electrical paths 24,25. In some instances, down-converters may not be used or up-converters may be required, depending upon the frequency of the radiation received compared to the operational frequency of the spectrum analyzers 26,27. The outputs of the integrated optic spectrum analyzers 26,27 are connected to a microcomputer 28. Switching means 23 is provided for switching signals provided by the first antenna 21 from the first electrical path 24 to the second electrical path 25. Simultaneously, the signals from the second antenna 22 are switched from the second electrical path 25 to the first electrical path 24. Switching of the switching means 23 is controlled by synchronization signals 37 which are provided at a preselected repetition rate by the microcomputer 28.

The two integrated optic spectrum analyzers 26,27 are substantially identical and each generally comprises a laser source 31, collimating optics 32, focusing optics 33, a detector array 34 which generally comprises a plurality of detector elements, and a surface acoustic wave transducer 35 disposed on an integrated circuit chip. For a better understanding of the design and operation of an integrated optic spectrum analyzer, see "Design, Fabrication and Integration of Components for an Integrated Optics Spectrum Analyzer," by M. K. Barnoski et al, 1978 Ultrasonics Symposium Proceedings, IEEE. "An integrated Optic RF Spectrum Analyzer," by M. C. Hamilton et al, *Optical Engineering*, Vol. 16, No. 5, and "Spectrum Analyzer Using Acousto-Optic Devices," by D. L. Hecht, *Optical Engineering*, Vol. 16, No. 5.

In operation, the two antennas 21,22 receive energy from a distant target and since they are generally oriented along non-parallel axes, their effective apertures relative to the incoming radiation is different. Accordingly, the intensity of the radiation received is different at both antennas. The energy from each antenna is down-converted by down-converter means 29,30, and transmitted along the electrical paths 24,25 to the transducers of the integrated optic spectrum analyzers 26,27.

The transducer 35 sets up acoustic waves in the top surface of the chip in response to signals applied thereto. The acoustic waves provided thereby act as a Bragg deflector with respect to the laser light interacting therewith. The laser light is deflected in proportion to the intensity and frequency of the signals applied to the transducer 35. The frequency of the signals received by the antennas 21,22 is determined by the particular detector channel to which the laser light is deflected. Signals at different frequencies are deflected by different amounts, and accordingly, the detector channel which receives the energy automatically identifies the frequency thereof. The integrated optic spectrum analyzers 26,27 thus process the energy received from the antennas 21,22 and provide output signals which are a function of the intensity and frequency of the signals received by the antennas 21,22. The detector array 34 may provide separate connections from each detector element to the microprocessor 28, or it may include a CCD array and provide output signals in the form of a serial train, in accordance with techniques well-known in the video signal processing art. The output signals from the integrated optic spectrum analyzers 26,27 are applied to the microcomputer 28 which processes these signals by means of a computer program, or the like, and provides a signal which is indicative of the direction of arrival of the radiation from the target.

Generally, the microcomputer calculates the direction of arrival of the incoming radiation from the equation:

$$\frac{\cos^2 \phi}{\cos^2(\phi + \theta)} = \frac{\gamma_1}{\gamma_2} = \left[ \frac{\alpha_{\gamma 1}}{\beta_{\gamma 2}} \cdot \frac{\beta_{\gamma 1}}{\alpha_{\gamma 2}} \right]^{\frac{1}{2}}$$

where $\phi$ is the angle between the pointing directions of the two antennas 21,22, $\theta$ is the angle between the axis of the first antenna 21 and the direction of the incoming radiation, $\gamma_1$ is the intensity of the radiation received by the first antenna 21, $\gamma_2$ is the intensity received by the second antenna 22, $\alpha$ is the gain of the first analyzer 26 and $\beta$ is the gain of the second analyzer 27. This equation assumes that the response of the two antennas 21,22 falls off in amplitude as a function of $\cos^2\phi$. This expression is true for antennas whose apertures are small as compared to the radiation wavelength. It is true to a first approximation for larger antennas.

Because of possible differences in the performance of the two integrated optic spectrum analyzers 26,27, the switching means 23 alternately switches the signals received by the two antennas 21,22 between the two integrated optic spectrum analyzers 26,27. The alternated signals may then be averaged and thus a normalized value for the direction of arrival may be obtained. If, however, for a given embodiment the performance characteristics of the two spectrum analyzers are substantially equivalent, the switching means 23 is not required. In this configuration, the signals from the first antenna 21 are continuously applied to the first spectrum analyzer 26 while the signals from the second antenna 22 are continuously applied to the second spectrum analyzer 27.

Thus, there has been described an improved signal processor which incorporates integrated optics and in particular, integrated optic spectrum analyzers and which is capable of determining the direction of arrival of incoming radiation from a remote target.

It is to be understood that the above-described embodiment is merely illustrative of but a small number of the many possible specific embodiments which can represent applications of the principles of the present invention. Numerous and varied other arrangements can readily be devised in accordance with these principles by those skilled in the art without departing from the spirit and scope of the invention.

I claim:

1. Apparatus for determining the direction of arrival of energy applied thereto said apparatus comprising:
    a first antenna pointed along a first direction for providing electrical signals indicative of energy received thereby;
    a second antenna pointed along a second direction for providing electrical signals indicative of energy received thereby;
    a first integrated optic spectrum analyzer connected to receive the electrical signals provided by one of said antennas and for processing said signals so as to provide output signals which are proportional to the intensity of energy applied to said one antenna;
    a second integrated optic spectrum analyzer connected to receive the electrical signals provided by the other of said antennas, and for processing said signals so as to provide output signals which are proportional to the intensity of energy applied to said other antenna;
    means for switching the coupling between said antennas and said spectrum analyzers such that different antennas are repetitively, alternately coupled to each of said spectrum analyzers; and
    computer means connected to receive the output signals from said first and second integrated optic spectrum analyzers, for processing said spectrum analyzer output signals and providing as a function thereof, a computer output signal indicative of the direction of arrival of energy received by said first and second antennas.

2. The apparatus of claim 1 wherein each of said spectrum analyzers includes a detector array comprising a plurality of detector elements deposed so as to be responsive to energy within respective frequency bands, such that the detector element which is activated is determinative of the frequency of the energy applied thereto.

* * * * *